United States Patent [19]

Bruestle

[11] Patent Number: 5,709,081
[45] Date of Patent: Jan. 20, 1998

[54] EXHAUST GAS SYSTEM FOR A COMBUSTION ENGINE WITH EXHAUST DRIVEN TURBO CHARGE

[75] Inventor: Claus Bruestle, Heimsheim, Germany

[73] Assignee: Dr. Ing. h.c.F. Porsche AG, Weissach, Germany

[21] Appl. No.: 744,067

[22] Filed: Nov. 4, 1996

Related U.S. Application Data

[63] Continuation of Ser. No. 319,073, Oct. 6, 1994, abandoned.

[30] Foreign Application Priority Data

Oct. 15, 1993 [DE] Germany .................. 45 35 153.0

[51] Int. Cl.⁶ .................................................. F01N 3/20
[52] U.S. Cl. .................. 60/274; 60/280; 60/284; 60/288
[58] Field of Search ............... 60/280, 288, 284, 60/274

[56] References Cited

U.S. PATENT DOCUMENTS

| | | | |
|---|---|---|---|
| 3,968,645 | 7/1976 | Noguchi | 60/288 |
| 4,122,673 | 10/1978 | Leins | 60/280 |
| 4,202,176 | 5/1980 | Metzger | 60/288 |
| 4,404,804 | 9/1983 | Tadokoro et al. . | |
| 5,325,666 | 7/1994 | Rutschmann | 60/288 |
| 5,345,762 | 9/1994 | Lütze | 60/288 |
| 5,377,486 | 1/1995 | Servati | 60/288 |

FOREIGN PATENT DOCUMENTS

| | | | |
|---|---|---|---|
| 0417412A2 | 3/1991 | European Pat. Off. . | |
| 0417412A3 | 3/1991 | European Pat. Off. . | |
| 2344022 | 3/1975 | Germany . | |
| 2549934 | 5/1977 | Germany . | |
| 3115739 | 11/1982 | Germany . | |
| 3518756 | 11/1986 | Germany | 60/280 |
| 3930380 | 3/1991 | Germany . | |
| 4024801 | 2/1992 | Germany . | |
| 4139291A1 | 6/1993 | Germany . | |
| 3309725 | 12/1988 | Japan | 60/288 |
| WO92/02175 | 2/1992 | WIPO . | |

OTHER PUBLICATIONS

Search Report, Feb. 7, 1979, France.

*Primary Examiner*—Douglas Hart
*Attorney, Agent, or Firm*—Evenson McKeown Edwards & Lenahan, PLLC

[57] ABSTRACT

An exhaust system for an internal combustion engine includes an exhaust turbocharger, and exhaust emission control with 3-way catalysts. In order to shorten the delay until emission control begins after the engine is started, a first catalytic converter is located in the exhaust line downstream from the turbocharger which is always traversed by the exhaust. Downstream of the turbocharger, a second catalytic converter is arranged that is traversed by exhaust only temporarily, with the second catalytic converter being traversed only until the exhaust system has reached a predetermined temperature.

18 Claims, 1 Drawing Sheet

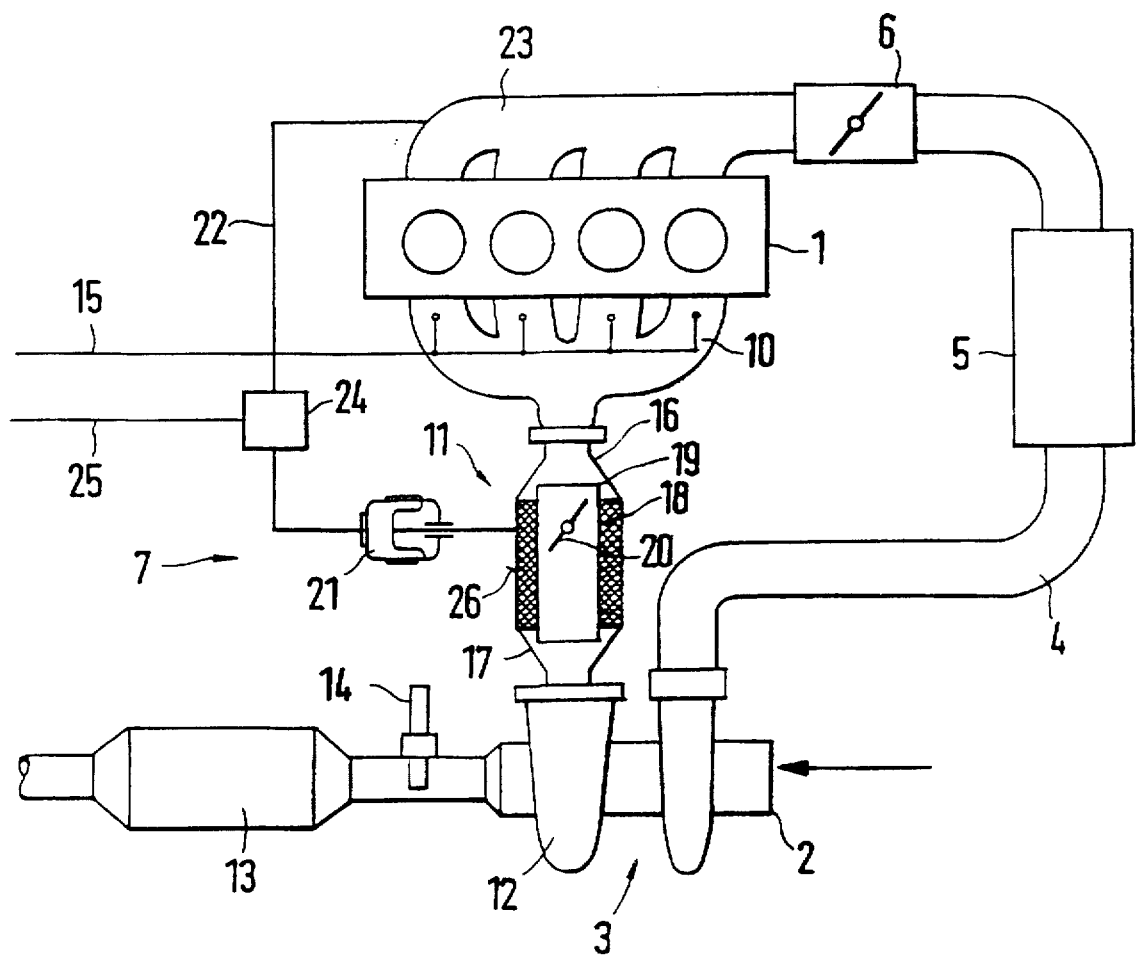

EXHAUST GAS SYSTEM FOR A COMBUSTION ENGINE WITH EXHAUST DRIVEN TURBO CHARGE

This application is a continuation of application Ser. No. 08/319,073 filed on Oct. 6, 1994, and now abandoned.

The invention relates to an exhaust system for an internal combustion engine with an exhaust turbocharger and at least one catalytic converter.

Internal combustion engines with exhaust turbocharger offer an outstanding potential for increasing the power density of the engine and hence a considerable potential for increasing the performance of a motor vehicle powered by the engine. One of the goals in the future development of engines with exhaust turbochargers is the improvement of emissions behavior. If a 3-way catalyst is used in this connection, the problem arises that during full-load operation with a stoichiometric fuel/air ratio ($\lambda=1$), very high exhaust temperatures develop and if the catalyst is located upstream from the turbocharger, the latter can be destroyed. If, on the other hand, the catalyst is located downstream from the turbocharger, a very long period of time elapses until the catalyst reaches its operating temperature, because in this case the mass of the turbocharger, which is still cold at the start, removes the heat from the exhaust.

Concepts have been developed to solve this problem for shortening the time required to heat the catalyst by using extreme catalyst heating in an exhaust turbocharger which is thermally protected and located downstream from the exhaust turbocharger.

In this connection, German Patent Document DE-A1 23 44 022 teaches a device for reducing the emissions content in the exhaust from engines in which thermal reactors located both upstream of and downstream of a turbocharger turbine are provided to avoid exhaust emissions. A complete chemical reaction is produced in the exhaust, and at the same time the energy liberated from the reactor located upstream of the turbocharger turbine is used to drive the turbocharger.

In addition, it is known from German Patent Document DE-A1 25 49 934, in an engine with an exhaust turbocharger, to provide a catalyst upstream of or downstream of an exhaust turbocharger and to provide in parallel, a bypass line between the engine and a rear muffler which is downstream from both the exhaust turbocharger and the catalyst. The bypass line is opened when the charging pressure generated in the exhaust turbocharger exceeds a predetermined amount. In this manner, exhaust emissions from a supercharged engine are improved by the catalyst without additional devices being necessary to avoid damage to the catalyst as a result of overload.

Taking its departure from this prior art, the invention is intended to solve the problem of providing an exhaust system for an engine with a turbocharger, said engine being provided with 3-way catalyzers for exhaust emissions control, shortening the delay until exhaust emission control begins after the engine is started.

In this connection, according to the invention, a first catalytic converter is provided, traversed by the exhaust, in an exhaust line downstream from the turbocharger, and a second catalytic converter, traversed only temporarily by the exhaust, is provided upstream from the turbocharger, with the second catalytic converter being traversed only until the exhaust system has reached a predetermined temperature. It is especially advantageous in the invention that both catalytic converters are protected against thermal overload. This is also true for engine operation at full load and stoichiometric fuel/air ratio ($\lambda=1$) at which extremely high exhaust temperatures develop. Since the second catalytic converter located upstream from the turbocharger, because of its position immediately behind the engine, is subjected to much higher exhaust temperatures when it is traversed by the exhaust after the engine starts, it reaches its operating temperature within a short time and hence can purify the exhaust effectively because no energy is removed from the exhaust by the mass of the turbocharger.

According to the preferred embodiments of the invention, it is advantageously achieved that the second catalytic converter, in its conducting state, conducts the exhaust stream without significant losses and thus permits boosting of the exhaust turbocharger turbine with optimum efficiency. At the same time this arrangement of the second catalytic converter is especially protected against thermal overload.

By cutting in the second catalytic converter at the moment when the first catalytic converter begins to purify the exhaust, assurance is provided that exhaust emission control is constantly guaranteed from the moment the second catalytic converter responds after the engine is started.

A common feature of all the embodiments of the invention is the protection of the exhaust turbocharger turbine against destruction of the turbine wheel by loosening of small particles from the so-called "wash coat," in other words the coating on the second catalytic converter, by the hot exhaust gas stream, said particles then being hurled against the turbine wheel by the exhaust stream with high energy. Finally, the position of the first catalytic converter can be chosen more widely since it is no longer necessary to locate the first catalytic converter directly downstream from the exhaust turbocharger for the fastest possible heating during the starting phase of the engine.

Other objects, advantages and novel features of the present invention will become apparent from the following detailed description of the invention when considered in conjunction with the accompanying drawings.

BRIEF DESCRIPTION OF THE DRAWINGS

The single drawing Figure schematically depicts an internal combustion engine with an exhaust turbocharger and a catalytic converter arrangement constructed according to a preferred embodiment of the invention.

DETAILED DESCRIPTION OF THE PREFERRED EMBODIMENTS

An engine 1 draws in fresh air through an intake line 2, said air passing through exhaust turbocharger 3 and pressure line 4 through an intercooler 5 and a throttle valve 6 first into intake manifold 23 and then into engine 1. The exhaust stream from engine 1 is released into the open through an exhaust system 7. In exhaust system 7, the exhaust gases initially flow through an exhaust manifold 10 mounted on engine 1 and through a primary catalytic converter 11 into an exhaust turbine 12 on exhaust turbocharger 3 and then through a main catalytic converter 13 into the surrounding atmosphere. Downstream from exhaust turbine 12, an oxygen sensor 14 determines the oxygen content of the exhaust stream. In addition, fresh air can be fed into exhaust manifold 10 through a secondary air inlet 15.

Primary catalytic converter 11 is designed as a switching catalytic converter. It consists of a housing 26 with an inlet 16, an outlet 17, and a catalyst body 18 made in the form of a ring, and located therebetween in housing 26. A bypass pipe 19 is located concentrically within body 18 of the catalytic converter and insulated therefrom. Between inlet 16 and bypass pipe 19 and between outlet 17 and bypass pipe 19 an annular gap is formed, so that the exhaust stream can pass through both catalytic converter body 18 and bypass pipe 19. Inlet 16, bypass pipe 19, and outlet 17 are aligned with one another, the diameter of the inlet 16 and the effective diameter of the outlet 17 being greater than the effective diameter of the bypass pipe 19. A control flap 20 is also provided in bypass pipe 19, said flap shutting off bypass pipe 19 and actuated by a vacuum control unit 21. Vacuum control unit 21 is connected by a line 22 with intake manifold 23 of engine 1, with line 22 having a solenoid valve 24.

Solenoid valve 24 is controlled through a signal lead 25 by a control device, not shown. In the resting state, i.e. when solenoid valve 24 is not energized, control flap 20 is open. In the working state, i.e. with solenoid valve 24 energized, the vacuum prevailing in intake manifold 23 acts on vacuum control unit 21, whose working stroke closes control flap 20. To control solenoid valve 24, the control device evaluates the temperature of the exhaust system and delivers a signal for as long as the temperature is below a preset value. The temperature is measured in this case by a temperature sensor in or on main catalytic converter 13 and the temperature threshold is set at 300° C. so that the main catalytic converter reaches its minimum operating temperature.

The system described operates as follows:

Following a cold start of engine 1, the control device determines that the temperature of main catalytic converter 13 is less than 300° C. The control device therefore delivers a signal through lead 25 to solenoid valve 24 and the vacuum, obtained through line 22 from intake manifold 23, closes control flap 20 by means of vacuum control unit 21. The exhaust stream from engine 1 then passes completely through body 18 of the catalytic converter, heating it rapidly so that exhaust purification likewise begins quickly. As engine 1 continues operating, exhaust turbine 12 and main catalytic converter 13 are also heated, with a time delay. When the control device detects that main catalytic converter 13 has reached its minimum operating temperature of 300° C., it closes solenoid valve 24 and vacuum control device 21 moves control flap 20 into its open position. From this point on, the exhaust stream of engine 1 passes through primary catalytic converter 11 nearly completely through bypass pipe 19, with catalytic converter body 18 no longer being effective, despite the fact the exhaust is flowing through it. As a result of the unimpeded flow, pressure fluctuations in the exhaust stream also pass unimpeded through primary catalytic converter 11 so that shock supercharging of exhaust turbine 12 is possible. On the other hand, the catalytic converter body is not heated any further, and in particular it does not reach the temperature of the exhaust stream that develops under full load, which would lead to thermal overload, in other words destruction of the body of catalytic converter 18. The main catalytic converter 13 on the other hand is protected against these temperatures by its distance from engine 1 and by its position downstream from exhaust turbine 12.

Tests have shown that in the system described above, with a test engine, primary catalytic converter 11 reaches its starting temperature for the beginning of exhaust purification after 28 seconds and main catalytic converter 13 reaches its starting temperature 65 seconds after a cold start. Hence, effective exhaust purification begins about 40 seconds earlier than would be the case without primary catalytic converter 11.

Blowing in fresh air by means of secondary air line 15 also improves the exhaust behavior of engine 1 following a cold start. In this phase, firstly oxygen sensor 14 has not yet reached its operating temperature, and secondly the engine is not always operated with a stoichiometric fuel/air ratio ($\lambda=1$), in order to ensure smooth operation. Since, on the other hand, at least a stoichiometric fuel/air ratio ($\lambda=1$) or an air surplus ($\lambda>1$) is required for optimum operation of primary catalytic converter 11, as long as operation of engine 1 with a stoichiometric fuel/air ratio ($\lambda=1$) is not possible, depending on the load state of engine 1, as much fresh air is added through secondary air line 15 to the exhaust stream as is necessary reliably to ensure a surplus of air ($\lambda>1$).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An internal combustion engine arrangement comprising:
    a multi-cylinder engine having an exhaust outlet and an air inlet,
    an exhaust gas driven turbocharger disposed downstream of the exhaust outlet and having an exhaust gas driven turbine operable to charge air supplied to the air inlet,
    a main catalytic converter disposed downstream of the exhaust driven turbine,
    a starting catalytic converter disposed between the exhaust outlet and the exhaust driven turbine, and
    an exhaust gas flow control system selectively supplying exhaust gas to the exhaust driven turbine from the exhaust outlet through the starting catalytic converter during first engine operating conditions and in bypassing relation to the starting catalytic converter during second engine operating conditions, said first engine operating condition being engine starting.

2. An internal combustion engine arrangement according to claim 1,
    wherein said first engine operating conditions are cold engine starting conditions,
    wherein said second engine operating conditions are warmed up engine operating conditions.

3. An internal combustion engine arrangement according to claim 1, wherein said control system includes a temperature sensor sensing a temperature of the main catalytic converter and a control device for the supplying of exhaust gas through the starting catalytic converter when the temperature of the main catalytic converter is below a predetermined value, corresponding to the first engine operating conditions.

4. An internal combustion engine arrangement according to claim 3, wherein said predetermined value of the temperature in the main catalytic converter is 300° C.

5. An internal combustion engine arrangement according to claim 2, further comprising means for blowing in fresh air into the exhaust outlet during said second engine operating conditions.

6. An internal combustion engine arrangement according to claim 4, further comprising means for blowing in fresh air into the exhaust outlet during said second engine operating conditions.

7. An internal combustion engine arrangement according to claim 1, wherein the starting catalytic converter comprises:
    a housing with an inlet and an outlet, an annular catalytic converter body located between the inlet and outlet, a bypass pipe mounted concentrically inside the catalytic converter body, and a remotely operated control flap disposed to selectively close the bypass pipe, and wherein said control system includes a solenoid operably connected with the control flap.

8. An internal combustion engine arrangement according to claim 1, wherein the first engine operating conditions correspond to the temperature of the exhaust system being below a preset limiting value.

9. An internal combustion engine arrangement according to claim 7, wherein the first engine operating conditions correspond to the temperature of the exhaust system being below a preset limiting value.

10. An internal combustion engine arrangement according to claim 8, wherein the control system includes a detector for detecting the temperature of the exhaust system by detecting the temperature of the main catalytic converter and the preset limiting value corresponds to the minimum operating temperature of the main catalytic converter.

11. An internal combustion engine arrangement according to claim 9, wherein the control system includes a detector for detecting the temperature of the exhaust system by detecting the temperature of the main catalytic converter and the preset limiting value corresponds to the minimum operating temperature of the main catalytic converter.

12. An internal combustion engine arrangement according to claim 7, wherein the inlet, the bypass pipe, and the outlet are aligned with one another, the effective diameter of the bypass pipe being larger than or equal to the effective diameter of the inlet, and the effective diameter of the outlet being larger than or equal to the effective diameter of the bypass pipe.

13. An internal combustion engine arrangement according to claim 12, wherein the control system includes a detector for detecting the temperature of the exhaust system by detecting the temperature of the main catalytic converter and the preset limiting value corresponds to the minimum operating temperature of the main catalytic converter.

14. An internal combustion engine arrangement according to claim 9, wherein the inlet, the bypass pipe, and the outlet are aligned with one another, the effective diameter of the bypass pipe being larger than or equal to the effective diameter of the inlet, and the effective diameter of the outlet being larger than or equal to the effective diameter of the bypass pipe.

15. An internal combustion engine arrangement according to claim 11, wherein the inlet, the bypass pipe, and the outlet are aligned with one another, the effective diameter of the bypass pipe being larger than or equal to the effective diameter of the inlet, and the effective diameter of the outlet being larger than or equal to the effective diameter of the bypass pipe.

16. A method of operating an internal combustion engine arrangement of the type having:

a multi-cylinder engine having an exhaust outlet and an air inlet, an exhaust gas driven turbocharger disposed downstream of the exhaust outlet and having an exhaust gas driven turbine operable to charge air supplied to the air inlet, a main catalytic converter disposed downstream of the exhaust driven turbine, and a starting catalytic converter disposed between the exhaust outlet and the exhaust driven turbine, said method comprising controlling an exhaust gas flow control system selectively supplying exhaust gas to the exhaust driven turbine from the exhaust outlet through the starting catalytic converter during first engine operating conditions and in bypassing relation to the starting catalytic converter during second engine operating conditions, said first engine operating condition being engine starting.

17. A method of operation according to claim 16, wherein said first engine operating conditions are cold engine starting conditions, wherein said second engine operating conditions are warmed up engine operating conditions.

18. A method according to claim 17, further comprising blowing in fresh air into the exhaust outlet during said second engine operating conditions.

* * * * *